(12) United States Patent
Yang

(10) Patent No.: US 11,852,943 B2
(45) Date of Patent: Dec. 26, 2023

(54) ELECTROCHROMIC DEVICE AND PREPARATION METHOD THEREFOR, AND ELECTRONIC EQUIPMENT

(71) Applicant: GUANGDONG OPPO MOBILE TELECOMMUNICATIONS CORP., LTD., Guangdong (CN)

(72) Inventor: Xin Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 508 days.

(21) Appl. No.: 17/210,084

(22) Filed: Mar. 23, 2021

(65) Prior Publication Data
US 2021/0208466 A1    Jul. 8, 2021

Related U.S. Application Data

(63) Continuation of application No. PCT/CN2019/096382, filed on Jul. 17, 2019.

(30) Foreign Application Priority Data

Sep. 30, 2018 (CN) .......................... 201811159209.7

(51) Int. Cl.
*G02F 1/1523* (2019.01)
*G02F 1/1506* (2019.01)
*G02F 1/155* (2006.01)

(52) U.S. Cl.
CPC ............ *G02F 1/1525* (2013.01); *G02F 1/155* (2013.01); *G02F 1/1508* (2013.01)

(58) Field of Classification Search
CPC ....... G02F 1/1525; G02F 1/1508; G02F 1/155

USPC .................................................. 359/265–275
See application file for complete search history.

(56) References Cited

U.S. PATENT DOCUMENTS

| 4,324,622 A | 4/1982 | Deb |
| 2017/0108754 A1 | 4/2017 | Ali |

FOREIGN PATENT DOCUMENTS

| CN | 1989445 A | 6/2007 |
| CN | 101131799 A | 2/2008 |
| CN | 103885264 A | 6/2014 |
| CN | 105573003 A | 5/2016 |

(Continued)

OTHER PUBLICATIONS

Extended European Search Report for EP Application 19867045.7 dated Sep. 9, 2021. (5 pages).

(Continued)

*Primary Examiner* — William Choi
(74) *Attorney, Agent, or Firm* — Young Basile Hanlon & MacFarlane, P.C.

(57) ABSTRACT

An electrochromic device includes: a first substrate and a second substrate provided opposite to each other; a first transparent conductive layer and a second conductive layer provided between the first substrate and the second substrate; an electrochromic layer provided between the first transparent conductive layer and the second conductive layer; a bottom printed layer provided on a surface of the second substrate away from the second conductive layer; and a pattern layer. An orthographic projection of the pattern layer on the first substrate covers at most a part of a surface of the first substrate, and a color of the electrochromic device varies as a voltage between the first transparent conductive layer and the second conductive layer changes.

20 Claims, 3 Drawing Sheets

(56) References Cited

FOREIGN PATENT DOCUMENTS

| | | |
|---|---|---|
| CN | 106527810 A | 3/2017 |
| CN | 206848662 U | 1/2018 |
| CN | 107841776 A | 3/2018 |
| CN | 107864581 A | 3/2018 |
| CN | 207427625 U | 5/2018 |
| CN | 108177475 A | 6/2018 |
| CN | 108198511 A | 6/2018 |
| CN | 108382043 A | 8/2018 |
| CN | 108519709 A | 9/2018 |
| CN | 108541167 A | 9/2018 |
| CN | 108549182 A | 9/2018 |
| CN | 108549184 A | 9/2018 |
| CN | 108549185 A | 9/2018 |
| CN | 108594557 A | 9/2018 |
| CN | 109116652 A | 1/2019 |
| KR | 20170094627 A | 8/2017 |
| WO | 2010099147 A1 | 9/2010 |

OTHER PUBLICATIONS

ISR and English translation for PCT application PCT/CN2019/096382 mailed Nov. 20, 2019.
First OA with English Translation for CN application 201811159209.7 mailed Apr. 27, 2020.
Second OA with English Translation for CN application 201811159209.7 mailed Nov. 5, 2020.
Chinese Office Action with English Translation for CN Application 201811159209.7 mailed Apr. 26, 2021. (12 pages).

ELECTROCHROMIC DEVICE AND PREPARATION METHOD THEREFOR, AND ELECTRONIC EQUIPMENT

CROSS-REFERENCE TO RELATED APPLICATION(S)

This application is a continuation of the International Patent Application No. PCT/CN2019/096382, filed Jul. 17, 2019, which claims priority to Chinese Patent Application Ser. No. 201811159209.7, filed on Sep. 30, 2018, the contents of both of which are incorporated herein by reference in their entireties.

TECHNICAL FIELD

The present disclosure relates to a field of electronic equipment manufacture, and more particularly to an electrochromic device and a preparation method therefore as well as an electronic equipment.

BACKGROUND

Electrochromic materials are widely used in electronic devices, resulting in a stable and reversible color change for the devices under an external electric field. Nowadays, consumers not only pursue the diversification of functions of electronic products, but also have increasingly higher requirements for the appearance and texture of the electronic products. However, once the outer housing of the electronic device is finished, the color of the outer housing is fixed and immutable, and thus it is difficult to meet the various needs of the users.

SUMMARY

In an aspect of the present disclosure, an electrochromic device is provided. The electrochromic device includes a first substrate and a second substrate provided opposite to each other; a first transparent conductive layer and a second conductive layer provided between the first substrate and the second substrate; an electrochromic layer being provided between the first transparent conductive layer and the second conductive layer; a bottom printed layer being provided on a surface of the second substrate away from the second conductive layer; and a pattern layer. An orthographic projection of the pattern layer on the first substrate covers at most a part of the surface of the first substrate, and a color of the electrochromic device varies as the voltage between the first transparent conductive layer and the second conductive layer changes.

In another aspect of the present disclosure, a method for preparing the electrochromic device is provided. The method for preparing an electrochromic device includes forming an electrochromic unit; forming a pattern layer; and forming a bottom printed layer. Forming the electrochromic unit includes providing a first transparent conductive layer, an electrochromic layer and a second conductive layer sequentially between a first substrate and a second substrate provided opposite to each other. An orthographic projection of the pattern layer on the first substrate covers at most part of a surface of the first substrate. The bottom printed layer is formed on a surface of the second substrate away from the second conductive layer.

In still another aspect of the present disclosure, an electronic equipment is provided. The electronic equipment includes the above-mentioned electrochromic device, a control circuit configured to control the electrochromic device to change its color according to an operating state of the electronic device and a screen configured to display information.

NUMERALS

Figure 1:
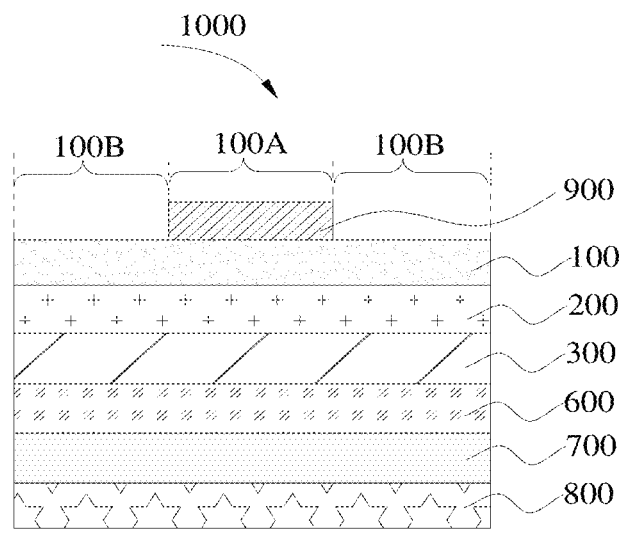
FIG. 1 is a schematic view illustrating an electrochromic device according to an embodiment of the present disclosure.

10: first optical adhesive layer; 20: second optical adhesive layer; 30: base; 100: first substrate; 200: first transparent conductive layer; 300: electrochromic layer; 400: electrolyte layer; 500: ion storage layer; 600: second conductive layer; 700: second substrate; 800: bottom printed layer; 900: pattern layer; 1000: electrochromic device; 1100: electronic equipment.

DETAILED DESCRIPTION

The embodiments of the present disclosure are described in detail below. Examples of the embodiments are shown in the accompanying drawings, wherein same or similar elements and the elements having same or similar functions are denoted by like reference numerals throughout the descriptions. The following embodiments described with reference to the drawings are illustrative and only used to explain the present disclosure, but may not be interpreted as the restrictions of this present disclosure.

It should be noted that the features and effects described in various aspects of the present disclosure may be mutually applied, and will be not repeatedly described herein.

The present disclosure is based on the findings and the recognition of the following facts and problems.

The inventor finds that the current electrochromic devices, especially the electrochromic devices used in a housing of electronic equipments, cannot meet the needs of users in terms of appearance effects such as colors. The color of the electrochromic material may vary with the magnitude and direction of the voltage. When the electrochromic material is applied to the electrochromic device, the electrochromic device may present different colors under different voltages. Therefore, after the electrochromic device is fabricated, its color may vary with the voltage, such that the color is richer. For example, after an outer housing of an electronic device prepared by an electrochromic device, its color may vary with the voltage, such that the color is richer. However, the inventor have made deep study to find out that the electrochromic device prepared by the above-mentioned method may only present an appearance effect of different colors, and cannot achieve other appearance effects in combination of textures and patterns, resulting in a single appearance effect of the product. Moreover, in a certain voltage state, the entire electrochromic device may only present one color, and the contrast color effect of multiple colors cannot be achieved. Moreover, it is difficult to realize a color change in a partial area of the electrochromic device as desired, without changing the color of the rest area. Therefore, in order to solve the problems above to a large extent, a new electrochromic device, which is capable of achieving a combination effect of various patterns and textures of the electrochromic device produced by electrochromic materials and a contrast color effect of multiple colors under the same voltage state, is needed.

In an aspect of the present disclosure, an electrochromic device is provided. In an embodiment of the present disclosure, referring to FIG. 1, the electrochromic device 1000 includes a first substrate 100 and a second substrate 700 provided opposite to each other, and a first transparent conductive layer 200 and a second conductive layer 600 provided between the first substrate 100 and the second substrate 700, an electrochromic layer 300 being provided between the first transparent conductive layer 200 and the second conductive layer 600, a bottom printed layer 800 being provided on a surface of the second substrate 700 away from the second conductive layer 600, and a pattern layer 900. An orthographic projection of the pattern layer 900 on the first substrate 100 covers at most a part of a surface of the first substrate 100, and a color of the electrochromic device 1000 varies as a voltage between the first transparent conductive layer 200 and the second conductive layer 600 changes.

That is, in the embodiments of this present disclosure, the electrochromic device 1000 includes a first substrate 100, a first transparent conductive layer 200, an electrochromic layer 300, a second conductive layer 600, a second substrate 700, a bottom printed layer 800 and a pattern layer 900. The first transparent conductive layer 200 is provided on the first substrate 100. The electrochromic layer 300 is provided on a surface of the first transparent conductive layer 200 away from the first substrate 100. The second conductive layer 600 is provided on a surface of the electrochromic layer 300 away from the first transparent conductive layer 200. The second substrate 700 is provided on a surface of the second conductive layer 600 away from the electrochromic layer 300. The bottom printed layer 800 is provided on a surface of the second substrate 700 away from the second conductive layer 600. The pattern layer 900 is provided at a side of the second conductive layer 600 away from the second substrate 700. That is, the pattern layer 900 is provided above the second conductive layer 600 in a vertical direction of the drawings. For example, the pattern layer 900 may be provided on a surface of the first substrate 100 away from the first transparent conductive layer 200, between the first substrate 100 and the first transparent conductive layer 200, between the first transparent conductive layer 200 and the electrochromic layer 300, or on a surface of the second conductive layer 600 away from the second substrate 700. An orthographic projection of the pattern layer 900 on the first substrate 100 covers at most a part of a surface of the first substrate 100. Therefore, by simply providing the pattern layer 900 and providing the pattern layer 900 at the side of the second conductive layer 600 away from the second substrate 700 (the first substrate 100 of the electrochromic device 1000 may be facing to and near the user during use), the electrochromic device 1000 may simultaneously present a combination effect of electrochromic colors and various patterns, textures, etc., and may easily achieve effects of contrast color and partial color change. When the electrochromic device 1000 is applied to the outer housing of the electronic device, the appearance of the housing may be diversified, and the expressiveness of the product may be improved.

In order to facilitate understanding, the electrochromic device according to the embodiments of the present disclosure, which is capable of achieving the above-mentioned technical effects, works according to the following principle.

As mentioned above, the electrochromic device fabricated from electrochromic materials, especially the electrochromic device used in the outer housing of the electronic equipment, may only present an appearance effect of different colors, and cannot achieve other appearance effects in combination of textures and patterns, resulting in a single appearance effect of the product. Moreover, in a certain voltage state, the entire electrochromic device may only present one color, and the contrast color effect of multiple colors cannot be achieved. Moreover, it is difficult to realize a color change in a partial area of the electrochromic device as desired, without changing the color of the rest area. In the electrochromic device of the embodiments of the present disclosure, the pattern layer is provided. Specifically, the first substrate of the electrochromic device may be facing to and near the user during use, and the pattern layer may be provided at a side of the second conductive layer away from the second substrate. That is, the pattern layer may be provided at any position at the side of the second conductive layer facing the user, and the orthographic projection of the pattern layer on the first substrate covers only a part of the surface of the first substrate. Therefore, the pattern layer may easily shield a part of the electrochromic layer exhibiting the electrochromic color, the electrochromic device simultaneously presents the electrochromic color and the combination effect of the color, pattern and texture of the pattern layer, and the appearance of the electrochromic device may be diversified. Moreover, the transmittance of the pattern layer is designed. When the light transmittance of the pattern layer is large, the orthographic projection area of the pattern layer on the first substrate (refer to the orthographic projection area 100A of the pattern layer 900 on the first substrate 100 in FIG. 1) may present a combined effect of the electrochromic color and the pattern layer. When the electrochromic device is applied to the outer housing of the electronic device, the appearance of the housing may be further enriched.

In the embodiments of the present disclosure, the various structures of the electrochromic device will be described in detail as follows.

In the embodiment of the present disclosure, the specific material of the first substrate 100 may be suitably selected by those skilled in the art, as long as the first substrate is formed from a transparent material. Therefore, the color generated by the electrochromic layer 300 may be presented through the first transparent conductive layer 200 and the first substrate 100. Specifically, the transparent material forming the first substrate 100 may be glass with advantages of good light transmittance, corrosion resistance, heat resistance, easy processing, etc., and is easily acquired and costs less. Alternatively, the transparent material forming the first substrate 100 may be plastic. Specifically, it may be polyethylene terephthalate or polycarbonate. Therefore, the toughness of the electrochromic device 1000 may be enhanced, such that the electrochromic device 1000 has a good drop resistance and a relatively low cost. In the embodiment of the present disclosure, the first substrate 100 may also be the outer housing of the electronic device. Therefore, the outer housing of the electronic device may be easily provided with a diversified electrochromic appearance effect, resulting in various appearances of the electronic equipment.

In the embodiment of the present disclosure, the specific material of the first transparent conductive layer 200 may be suitably selected by those skilled in the art. Specifically, the specific material of the first transparent conductive layer 200 may be a metal oxide film or nano silver. Among them, the metal oxide film may be an indium tin oxide (ITO) film, indium zinc oxide (IZO) film, indium gallium zinc (IGZO) film or aluminum zinc oxide (AZO) film. Therefore, the first transparent conductive layer 200 may have good conductivity and high transparency.

In the embodiment of the present disclosure, the specific material of the electrochromic layer 300 may be suitably selected by those skilled in the art, and may be an inorganic substance or an organic substance. For example, the inorganic substance electrochromic material forming the electrochromic layer 300 may be selected from tungsten trioxide (WO3), vanadium pentoxide (V2O5), etc., the organic forming the electrochromic layer 300 may be an organic small molecule electrochromic material, such as bipyridine, etc., and the organic forming the electrochromic layer 300 may also be a conductive polymer, such as polythiophene, polyaniline, polypyrrole, polycarbazole, polyfuran, polybenzazole and their derivatives, etc.

In the embodiment of the present disclosure, the specific material forming the second conductive layer 600 may be suitably selected by those skilled in the art, as long as it has conductive properties. Specifically, the second conductive layer 600 may be formed from a transparent conductive material or an opaque conductive material, for example, it may be formed from an indium tin oxide (ITO) film or an indium zinc oxide (IZO) film, or may be formed from a metal material such as aluminum and copper.

In an embodiment of the present disclosure, when the first substrate 100 is formed from a transparent material such as glass, the second substrate 700 may be formed from a transparent material or an opaque material. Specifically, the second substrate 700 may also be formed from materials such as glass or plastic. Specifically, the second substrate 700 may be formed from a flexible plastic film, for example, a polyethylene terephthalate film or a polycarbonate film. Therefore, a thickness of the second substrate 700 formed from the flexible material is small, which may reduce an overall thickness of the electrochromic device 1000, and the efficiency of forming the second conductive layer 600 on the flexible material is high and the cost is low. In an embodiment of the present disclosure, when the second conductive layer 600 is formed from a transparent conductive material, the bottom printed layer 800 may be formed on the surface of the second substrate 700 away from the second conductive layer 600. When the electrochromic device 1000 is used to form the outer housing of the electronic device, the bottom printed layer 800 may shield components in the electronic device, and may further improve the final effect of the electrochromic device 1000. In some embodiments of the present disclosure, ink of different colors (or with different texture effects) may be directly printed on the surface of the second substrate 700 away from the second conductive layer 600, as long as the components in the electronic device may be shielded. In other embodiments of the present disclosure, a film with a certain color or texture (e.g., polyethylene terephthalate film) may be bonded on the surface of the second substrate 700 away from the second conductive layer 600, such that the components in the electronic equipment may also be easily shielded.

Figure 5:
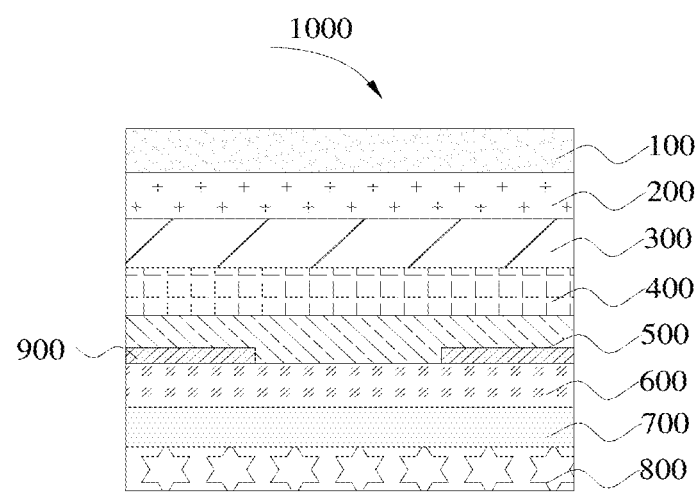
FIG. 5 is a schematic view illustrating an electrochromic device according to still another embodiment of the present disclosure.

In an embodiment of the present disclosure, referring to FIG. 5, the electrochromic device 1000 may further include an electrolyte layer 400 and an ion storage layer 500 sequentially arranged. The electrolyte layer 400 and the ion storage layer 500 are located between the electrochromic layer 300 and the second conductive layer 600, and the electrolyte layer 400 is located near the electrochromic layer 300. That is, the electrolyte layer 400 is located on the surface of the electrochromic layer 300 away from the first transparent conductive layer 200, and the ion storage layer 500 is located on the surface of the electrolyte layer 400 away from the electrochromic layer 300. In an embodiment of the present disclosure, when the electrochromic layer 300 is formed from organic materials, the electrolyte layer 400 may be formed from colloidal materials. In an embodiment of the present disclosure, ions in the electrolyte layer 400 may be doped or de-doped with the electrochromic materials in the electrochromic layer 300, thereby causing the electrochromic layer 300 to change in color. In an embodiment of the present disclosure, a thickness of the ion storage layer 500 may be on the nanoscale. Therefore, the electrochromic layer 300 may be changed in color. In an embodiment of the present disclosure, the ions in the ion storage layer 500 present a certain color. When the thickness of the ion storage layer 500 is thick, the color of the ion storage layer 500 is relative dark. When the electrochromic device is not under voltage, the color of the ion storage layer 500 will be present through the electrolyte layer 400, the electrochromic layer 300, the first transparent conductive layer 200 and the first substrate 100, such that the electrochromic device 1000 presents a certain degree of color, thus affecting the electrochromic effect of the electrochromic device.

In an embodiment of the present disclosure, the specific type of the pattern layer 900 may be designed by those skilled in the art according to the desired appearance effect. For example, the pattern layer 900 may include at least one selected from a group consisting of a texture printed sublayer, an optical coating sublayer and an ink sublayer. Specifically, the pattern layer 900 may include an ink sublayer with a single color effect or a combination effect of multiple colors. For example, the ink sublayer may have a contrast color effect of different colors and a gradient color effect. Specifically, the pattern layer 900 may also have a combination effect of color, texture and pattern. Therefore, the appearance effects such as the color, the texture and the pattern of the pattern layer 900 may be combined with the color effect of the electrochromic layer 300, thereby diversifying the appearance of the electrochromic device 1000. For example, referring to FIG. 1, the area 100A where the pattern layer 900 is provided on the first substrate 100 may have the appearance effect of the color and pattern presented by the pattern layer 900, and the area 100B where the pattern layer 900 is not provided may present the color and the color change effect of the electrochromic layer 300, such that the combination of the appearance effect of the pattern layer 900 and the appearance effect of the electrochromic layer 300 may be realized for the electrochromic device 1000, which further diversifies the appearance of the electrochromic device 1000.

In an embodiment of the present disclosure, the transparency of the pattern layer 900 may be suitably selected by those skilled in the art. For example, the pattern layer 900 may be completely opaque, such that the electrochromic device 1000 may present a combination effect of the colors of the pattern layer 900 and the electrochromic layer 300. Specifically, the pattern layer 900 may also have a certain degree of transparency. For example, the transmittance of the pattern layer 900 may be greater than 5%. Therefore, the area where the orthographic projection of the pattern layer 900 on the first substrate 100 may simultaneously present the combined effect of the appearances such as the color, the texture and the pattern of the pattern layer 900, and the color of the electrochromic layer 300, thereby further diversifying the appearance of the electrochromic device. In a specific embodiment of the present disclosure, referring to FIG. 1, a pattern layer 900 with a first color may be provided on one side of the first substrate 100 in advance, and under a certain voltage, the electrochromic layer 300 presents a second color. Then the area 100A where the pattern layer 900 is provided on the first substrate 100 presents the combination effect of the first color and the second color (i.e., a third color), and the area 100B where the pattern layer 900 is not provided presents the second color of the electrochromic layer 300. Therefore, the contrast color effect of the third color and the second color is realized for the electrochromic device 1000. Moreover, when the color of the electrochromic layer 300 varies as the voltage changes, the area 100A where the pattern layer 900 is provided on the first substrate 100 may present a combined color effect of the changeable color and the color of the pattern layer 900, such that the area 100A where the pattern layer 900 is provided may also present different color effects with the change of the voltage. Moreover, the area 100A where the pattern layer 900 is provided and the area 100B where the pattern layer 900 is not provided may present a diversified contrast color effect, which greatly diversifies the appearance effect of the electrochromic device 1000.

In an embodiment of the present disclosure, the position and size of the orthographic projection of the pattern layer 900 on the first substrate 100 may be designed by those skilled in the art may according to the desired appearance effect. By adjusting the size and position of the pattern layer 900, the electrochromic area and the electrochromic effect on the electrochromic device 1000 may be easily controlled. For example, when the electrochromic device 1000 is used to form an outer housing of an electronic equipment, the pattern layer 900 may cover all areas on the first substrate 100 except for the LOGO (trademark) mark (not shown in the figure). Therefore, the area where the LOGO mark is provided on the electrochromic device 1000 may present the color of the electrochromic layer 300, and other areas may present an appearance effect of the color and the pattern of the pattern layer 900, or present an appearance combination effect of the colors and patterns of the pattern layer 900 and the electrochromic layer 300, thereby further improving the appearance of the electrochromic device.

In an embodiment of the present disclosure, the pattern layer 900 may be directly formed at a certain position on the electrochromic device 1000. For example, ink or the like may be printed directly on the first substrate 100 to form the pattern layer 900. It is also possible to make a pattern layer 900 with certain color, pattern, texture and other effects on a film (such as a PET film) in advance, and then bond the pattern layer 900 including the film on the corresponding position in the electrochromic device 1000.

In an embodiment of the present disclosure, the pattern layer 900 is located at the side of the second conductive layer 600 away from the second substrate 700. That is, the pattern layer 900 may be located anywhere between the first substrate 100 and the second conductive layer 600, and at the side of the first substrate 100 away from the first transparent conductive layer 200. In a specific embodiment of the present disclosure, each position of the pattern layer 900 will be described in detail as following.

Figure 2:
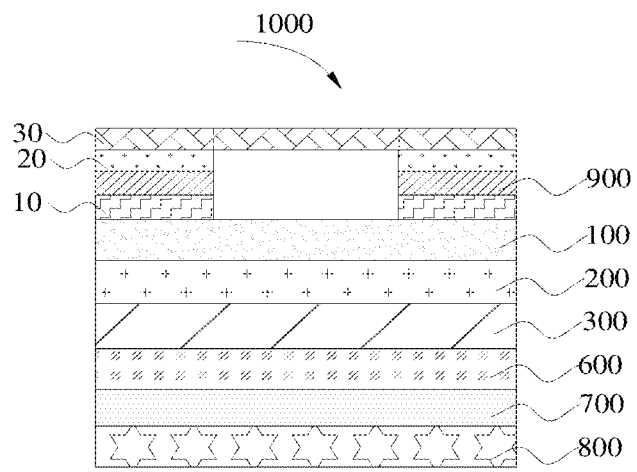
FIG. 2 is a schematic view illustrating an electrochromic device according to another embodiment of the present disclosure.

In an embodiment of the present disclosure, referring to FIG. 2, the pattern layer 900 may be located on the side of the first substrate 100 away from the first transparent conductive layer 200. Specifically, the electrochromic device 1000 may further include a first optical adhesive layer 10 located between the pattern layer 900 and the first substrate 100. That is, the first optical adhesive layer 10 is located on the pattern layer 900, and the pattern layer 900 may be bonded on the surface of the first substrate 100 away from the first transparent conductive layer 200 by the first optical adhesive layer 10. Therefore, the pattern layer 900 may be easily mounded. In an embodiment of the present disclosure, the electrochromic device 1000 may further include a base 30 and a second optical adhesive layer 20. The second optical adhesive layer 20 is located on the surface of the pattern layer 900 away from the first optical adhesive layer 10, and the base 30 is bonded at a side of the pattern layer 900 away from the first substrate 100 by the second optical adhesive layer 20. It should be noted that the base 30 may be a glass plate or a plastic plate. That is, the base 30 may be a board of the electrochromic device 1000 without the electrochromic unit (the electrochromic unit includes the first transparent conductive layer 200, the electrochromic layer 300, the second conductive layer 600, the second substrate 700, and the bottom printed layer 800) and the pattern layer 900. When the electrochromic device 1000 is used to form the housing of the electronic equipment, the base 30 may have the size and shape of the housing, and have a certain strength and supporting ability. In a specific embodiment of the present disclosure, when the pattern layer 900 is located on the side of the first substrate 100 away from the first transparent conductive layer 200, the base 30 (i.e., the board of the electrochromic device), the pattern layer 900 and the electrochromic unit may be fabricated as independent units. After each one of them are fabricated, they may be simply bonded together with optical adhesives to form the electrochromic device 1000 according to the embodiment of the present disclosure. Therefore, there is no need to change the existing fabricating process of the electrochromic unit, etc., and the operation is relatively simple. For example, when the base 30 (i.e., the board of the electrochromic device), the pattern layer 900 and the electrochromic unit are independently fabricated, the molding process of the base 30 is relatively simple, and the existing production process may be used without considering the difficulty of forming the electrochromic unit on the base 30. For example, the types of the materials fabricating pattern layer 900 are also relatively diversified. For example, ink may be printed on the film for optical coating without considering that when the pattern layer and the electrochromic unit are fabricated together, the high deposition temperature of the first transparent conductive layer and the second conductive layer will affect the shape and properties of the ink layer. For example, when the electrochromic unit is fabricated, there is no need to consider whether the ink layer is resistant to high temperature, and the first substrate and the second substrate may be fabricated from flexible materials. Later, the electrochromic unit may be bonded to the pattern layer 900 and the base 30 by optical adhesives.

Figure 3:
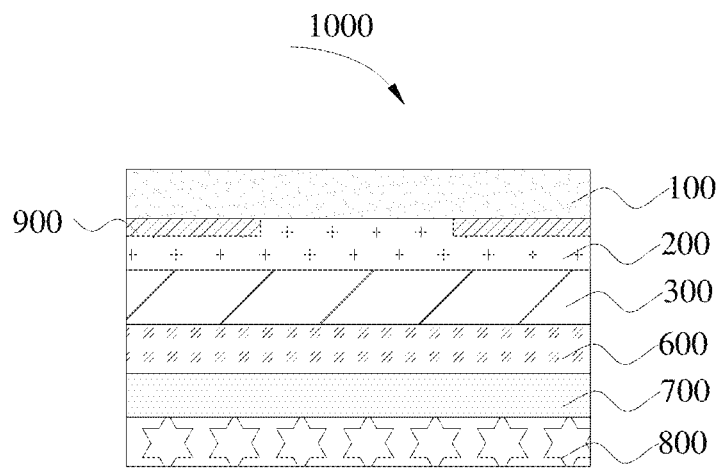
FIG. 3 is a schematic view illustrating an electrochromic device according to still another embodiment of the present disclosure.

In a specific embodiment of the present disclosure, referring to FIG. 3, the pattern layer 900 may be located between the first substrate 100 and the first transparent conductive layer 200. That is, the pattern layer 900 may be located on a surface of the first substrate 100 near the first transparent conductive layer 200, the first transparent conductive layer 200 covers a surface of the pattern layer 900 away from the first substrate 100, and the surface of the first substrate 100 facing to the side of the pattern layer 900 and not covered by the pattern layer 900. In an embodiment of the present disclosure, the pattern layer 900 is provided in a part of the area between the first substrate 100 and the first transparent conductive layer 200. When deposition and formation of the first transparent conductive layer 200 is performed on the first substrate 100, the first transparent conductive layer 200 is deposited on the pattern layer 900 and the surface of the first substrate 100. If a thickness of the first transparent conductive layer 200 is too small, thickness uniformity of the first transparent conductive layer 200 is likely to be poor, thereby affecting the conductive performance of the first transparent conductive layer 200, and affecting the performance of the electrochromic device. Thus, according to an embodiment of the present disclosure, the thickness of the first transparent conductive layer 200 may not be less than 30 nm, for example, it may be in a range of 30 to 250 nm, for example 50 nm, 100 nm, 120 nm, 150 nm, 200 nm, and 230 nm. Therefore, defects such as poor thickness uniformity and poor conductivity of the first transparent conductive layer 200 caused by the excessively small thickness of the first transparent conductive layer 200 may be avoided. Specifically, the thickness of the first transparent conductive layer 200 may be from 150 to 250 nm. Therefore, the first transparent conductive layer 200 having such thickness has better usability. In an embodiment of the present disclosure, a thickness of the pattern layer 900 may be suitably selected by those skilled in the art, as long as it is able to shield a part of the first transparent conductive layer 200. Specifically, when the first transparent conductive layer 200 is deposited and formed on the first substrate 100 on which the pattern layer 900 is printed, the side of the finally formed first transparent conductive layer 200 away from the first substrate 100 may exhibit a fluctuation due to different thicknesses (a part corresponding to an area where the pattern layer 900 is provided on the first transparent conductive layer 200 is convex and thus thicker). However, since the thickness fluctuation is small, the performance of the electrochromic device 1000 will not be affected. Moreover, the fluctuation may be adjusted once other structures are formed on the first transparent conductive layer 200, as long as the surface of the electrochromic device 1000 finally formed is relatively flat. In an embodiment of the present disclosure, the ink forming the pattern layer 900 may be a high temperature resistant ink, to meet a high temperature requirement for the deposition method used for forming the first transparent conductive layer 200 on the side of the pattern layer 900 away from the first substrate 100, such that the structure and appearance of the pattern layer 900 will not be affected during the entire process of preparing the electrochromic device 1000, thus further improving the usability of the electrochromic device 1000.

In an embodiment of the present disclosure, when the pattern layer 900 is located between the first substrate 100 and the first transparent conductive layer 200, a first wiring area (not shown in the figure, the first wiring area is used to provide a connecting wire connecting the power supply and the first transparent conductive layer, and the connecting wire is usually opaque. If no shielding structure is provided, the color of the connecting wire will present through the surface of the first substrate, causing appearance defects of the electrochromic device) may be covered. Therefore, the pattern layer 900 may shield the opaque connecting wires in the first wiring area, avoid appearance defects of the electrochromic device caused by the opaque connecting wire, and thus improve the appearance of the electrochromic device 1000.

Figure 4:
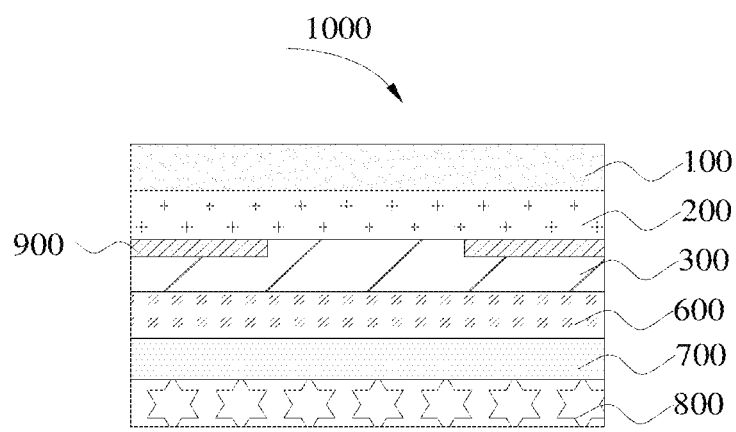
FIG. 4 is a schematic view illustrating an electrochromic device according to still another embodiment of the present disclosure.

In a specific embodiment of the present disclosure, referring to FIG. 4, the pattern layer 900 may be located between the first transparent conductive layer 200 and the electrochromic layer 300. That is, the pattern layer 900 may be located on the surface of the first transparent conductive layer 200 away from the first substrate 100, and the electrochromic layer 300 covers the surface of the pattern layer 900 away from the first transparent conductive layer 200 and the surface of the first transparent conductive layer 200 facing to the pattern layer 900 and not covered by the pattern layer 900.

In an embodiment of the present disclosure, referring to FIG. 5, the pattern layer 900 may be located between the ion storage layer 500 and the second conductive layer 600. That is, the pattern layer 900 may be located on the surface of the second conductive layer 600 away from the second substrate 700, and the ion storage layer 500 covers the surface of the pattern layer 900 away from the second conductive layer 600 and the surface of the second conductive layer 600 facing to the pattern layer 900 and not covered by the pattern layer 900. Specifically, the first transparent conductive layer 200 may be formed on the first substrate 100 (or the second conductive layer 600 may be formed on the second substrate 700) in advance, and the pattern layer 900 including the film may be mounted to a corresponding position on the first transparent conductive layer 200 (or the second conductive layer 600), and then the electrochromic layer 300 is formed (or the ion storage layer 500 is formed).

Figure 6:
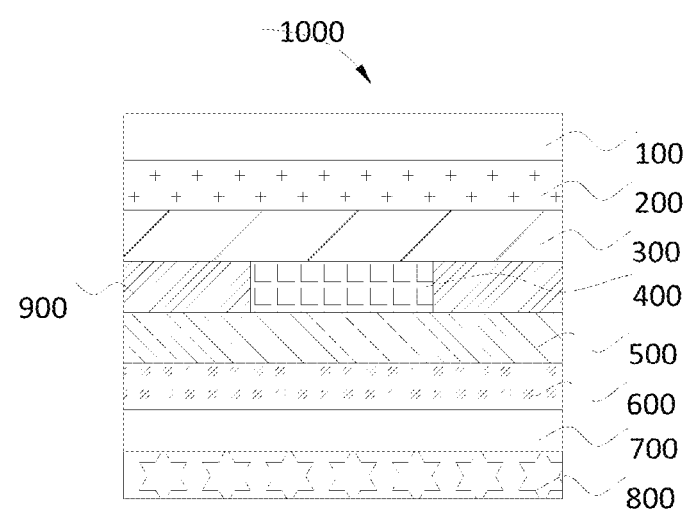
FIG. 6 is a schematic view illustrating an electrochromic device according to still another embodiment of the present disclosure.

In an embodiment of the present disclosure, referring to FIG. 6, the pattern layer 900 and the electrolyte layer 400 may be provided in one layer, and a thickness of the pattern layer 900 is equal to that of the electrolyte layer 400. Specifically, the pattern layer 900 may be formed on (for example, the patterned layer 900 including the film is bonded to) a surface of the ion storage layer 500 away from the second conductive layer 600 first. Then, an electrolyte layer 400 is formed on (for example, a gel-like dielectric layer material is coated on) the surface of the ion storage layer 500 away from the second conductive layer 600 that is not covered by the pattern layer 900. That is, the pattern layer 900 is formed on a part of the surface of the ion storage layer 500, and the electrolyte layer 400 is formed on another part of the same surface of the ion storage layer 500, which is not covered by the pattern layer 900. The thickness of the formed electrolyte layer 400 may be equal to that of the pattern layer 900, such that the thickness of the electrolyte layer 400 may be easily adjusted by adjusting the thickness of the pattern layer 900 formed by the film.

In an embodiment of the present disclosure, when the materials of all layers forming the electrochromic device include a semi-solid material, the electrochromic device may further include insulation adhesive. Therefore, the electrochromic device may be sealed to improve the sealing performance of the electrochromic device, such that the electrochromic device may present a good appearance effect when a voltage is applied. In an embodiment of the present disclosure, the insulation adhesive may be a tape. The position of the insulation adhesive may be designed by those skilled in the art according to the specific situation, as long as the above effects are achieved. For example, in an embodiment of the present disclosure, the insulation adhesive may be located between the first substrate and the second substrate, and is arranged around the periphery of the electrochromic layer, the electrolyte layer and the ion storage layer to seal the electrochromic layer, the electrolyte layer and the ion storage layer. In other embodiments of the present disclosure, the insulation adhesive is located between the first substrate and the second substrate, and is arranged around the periphery of the first transparent conductive layer, the electrochromic layer, the electrolyte layer, the ion storage layer and the second conductive layer to seal the electrochromic layer, the electrolyte layer, and the ion storage layer. Therefore, the electrochromic layer may be sealed and insulated to avoid interference from the external environment.

In an embodiment of the present disclosure, the electrochromic device may further include a connecting wire, which is connected to the first transparent conductive layer and the second conductive layer. Therefore, the circuit may be controlled to apply the voltage to the first transparent conductive layer and the second conductive layer, thereby controlling the electrochromic layer to change its color.

In other embodiments of the present disclosure, the formed connecting wire may also be a copper tape extending to a side away from the electrochromic layer and being near the edge of the electrochromic layer. There is an overlapping area between the copper tape and the edge of the conductive layers (i.e., the first transparent conductive layer and the second conductive layer). Therefore, the copper tape may be used to achieve electric conduction. In other embodiments of the present disclosure, the connecting wire may be a metal wire, and the metal wire and the conductive layer are connected by the insulation adhesive.

In another aspect of this present disclosure, a method for preparing an electrochromic device is provided. The method may easily prepare an electrochromic device having the appearance combining or superposing the color, pattern and texture of the pattern layer with the color of the electrochromic layer. In an embodiment of the present disclosure, the electrochromic device prepared by this method may be the above-mentioned electrochromic device. Therefore, the electrochromic device prepared by this method may have all the features and advantages of the above-mentioned electrochromic device, and will not be repeatedly described herein. In an embodiment of the present disclosure, the method includes forming an electrochromic unit, forming a pattern layer, and forming a bottom printed layer. Among them, the sequence of forming the electrochromic unit, forming the pattern layer, and forming the bottom printed layer may be suitably selected by those skilled in the art according to the specific position of the pattern layer. For example, it is possible to add a step of forming the pattern layer during the fabrication of the structure of each layer in the electrochromic unit. For example, after the electrochromic unit is fabricated, the bottom printed layer may be formed on the side of the second substrate away from the second conductive layer, or the bottom printed layer may be formed on the second substrate first, and then the second substrate is mounted to the first substrate.

Figure 7:
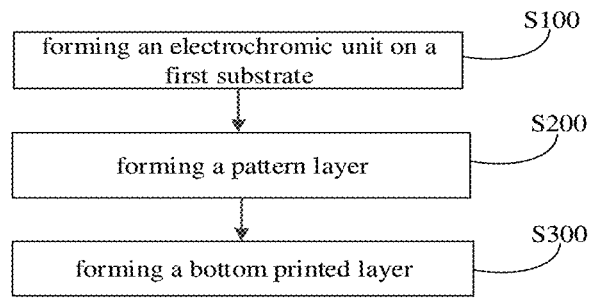
FIG. 7 is a flow chart illustrating a method for preparing an electrochromic device according to an embodiment of the present disclosure.

In an embodiment of the present disclosure, referring to FIG. 7, the method includes operations as follows.

In block S100: forming an electrochromic unit on a first substrate.

Figure 8:
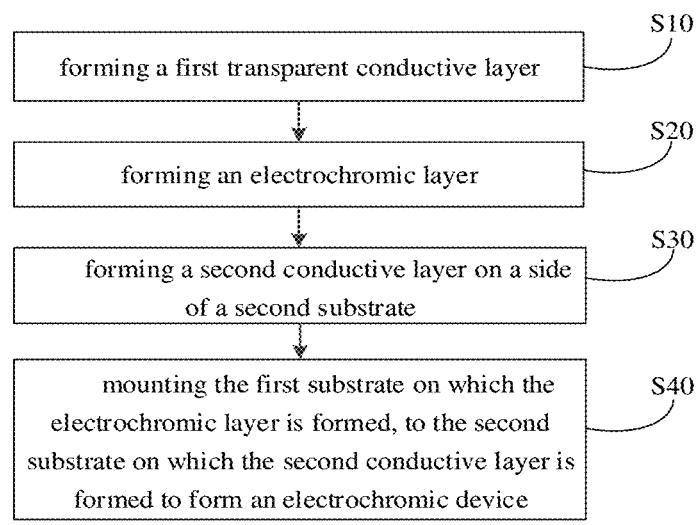
FIG. 8 is a flow chart illustrating a method for preparing an electrochromic device according to another embodiment of the present disclosure.

In this operation, the electrochromic unit is formed on the first substrate. In an embodiment of the present disclosure, the electrochromic unit includes a first transparent conductive layer, an electrochromic layer, a second conductive layer and a second substrate sequentially arranged on the first substrate. That is, the first transparent conductive layer is formed on the first substrate, the electrochromic layer is formed on the first transparent conductive layer, and the second conductive layer is formed on the electrochromic layer. In an embodiment of the present disclosure, the specific formation manner of the electrochromic unit may be suitably selected by those skilled in the art according to the specific material of the electrochromic layer (e.g., inorganic substances, organic small molecules, and conductive polymers). In specific embodiments of this disclosure, referring to FIG. 8, the method may further include operations as follows.

In block S10: forming the first transparent conductive layer.

In this operation, the first transparent conductive layer is formed on the first substrate. In an embodiment of the present disclosure, the first substrate may be the above-mentioned the first substrate. For example, the first substrate may be formed from a transparent material, and the first material may be glass or plastic. In an embodiment of the present disclosure, the first transparent conductive layer may be the above-mentioned first transparent conductive layer. Specifically, the first transparent conductive layer may be indium tin oxide or nano silver, and may have good conductivity and high transparency. In an embodiment of the present disclosure, the first transparent conductive layer may be formed by deposition (i.e., sputtering). Therefore, the first transparent conductive layer may be formed by a simple process.

In block S20: forming the electrochromic layer.

In this operation, the electrochromic layer is formed on the above-mentioned first substrate on which the first transparent conductive layer is formed. In an embodiment of the present disclosure, the material forming the electrochromic layer may be suitably selected by those skilled in the art. Specifically, the electrochromic material may be an inorganic substance (e.g. tungsten trioxide, vanadium pentoxide, etc.), an organic substance (for example, the electrochromic material may be a small organic molecule, e.g. bipyridine), a conductive polymer (e.g. polythiophene, polyaniline, polypyrrole, etc.). In an embodiment of the present disclosure, when the electrochromic material is an inorganic substance, inorganic nanoparticles may be dispersed in a solvent first, and then the electrochromic layer may be prepared by a printing method. Alternatively, when the electrochromic material is an organic small molecule, a vacuum filling manner may be used to form the electrochromic layer. Alternatively, the electrochromic layer formed from the conductive polymer may be prepared by the manners such as electropolymerization, thermal polymerization, coating, and photopolymerization. Therefore, the preparation manners of the electrochromic layer may be suitably selected by those skilled in the art according to the specific material of the electrochromic layer.

In block S30: forming the second conductive layer on a side of the second substrate.

In this operation, the second conductive layer is formed on the side of the second substrate. In an embodiment of the present disclosure, the second substrate may be the above-mentioned second substrate, the second conductive layer may be the above-mentioned second conductive layer, and the second substrate may be formed from a transparent material or an opaque material. For example, the second conductive layer may be formed from a transparent conductive material. Specifically, it may be indium tin oxide or nano silver. In an embodiment of the present disclosure, the manner of forming the second conductive layer may be the same as the manner of forming the first conductive layer described above, and will not be repeatedly described here.

In block S40: mounting the first substrate on which the electrochromic layer is formed to the second substrate on which the second conductive layer is formed to form the electrochromic device.

In this operation, the first substrate on which the electrochromic layer is formed is mounted to the second substrate on which the second conductive layer is formed, and the second conductive layer is in contact with the side of the electrochromic layer away from the first transparent conductive layer to form the electrochromic device. In an embodiment of the present disclosure, after the first transparent conductive layer and the electrochromic layer are formed on the first substrate, the second conductive layer may be formed on the second substrate (as described above), or the second conductive layer may be directly formed on the side of electrochromic layer away from the first transparent conductive layer, which may be selected by those skilled in the art according to the material of the electrochromic layer. Specifically, when the electrochromic layer is formed from the inorganic substance, after the ink layer is formed on the first substrate, the first transparent conductive layer, the electrochromic layer and the second conductive layer may be sequentially formed on the first substrate.

In an embodiment of the present disclosure, the method may further include forming an ion storage layer and forming an electrolyte layer. In an embodiment of the present disclosure, the ion storage layer and the electrolyte layer may be the above-mentioned ion storage layer and the electrolyte layer, and will not be repeatedly described here. In an embodiment of the present disclosure, the electrolyte layer may prevent migrated positive and negative ions from rapidly concentrating, thereby further improving the stability for the color change of the electrochromic layer. In some embodiments of the present disclosure, the ion storage layer may be formed on the side of the second conductive layer away from the second substrate, and the electrolyte layer may be formed on the side of the ion storage layer away from the second conductive layer, and then the electrolyte layer on the second substrate is mounted to, and thus is in contact with, the side of the electrochromic layer on the first substrate away from the first transparent conductive layer, so as to form the electrochromic device. In other embodiments of the present disclosure, the electrolyte layer may be directly formed on the side of the electrochromic layer away from the first transparent conductive layer, and the ion storage layer may be formed on the side of the electrolyte layer away from the electrochromic layer, to form the electrochromic device.

In specific embodiments of the present disclosure, when the electrochromic layer is formed from the conductive polymer, the ion storage layer may be formed by spin coating, curtain coating, roll coating, blade coating, dipping, spray coating, or silk screen printing, and the electrolyte layer may be obtained by uniformly coating the electrolyte layer material on the side of the ion storage layer away from the second conductive layer in the silk-screen printing manner. In a specific embodiment of the present disclosure, when the electrochromic layer is formed from the inorganic substance (e.g., tungsten trioxide), the ion storage layer and the electrolyte layer may be formed by a magnetron sputtering. In specific embodiments of the present disclosure, when the electrochromic layer is formed from the small organic molecule (e.g., bipyridine), the electrochromic layer may be formed by vacuum filling, and there is no need to additionally prepare the ion storage layer and the electrolyte layer.

In an embodiment of the present disclosure, when the first transparent conductive layer and the second conductive layer are formed, the connecting wire may be formed simultaneously, and the insulation adhesive is provided on the side of the connecting wire away from the conductive layer. Specifically, the specific materials and arrangements of the connecting wire may be the same as those described above, and will not be repeatedly described here. Therefore, the connecting wire may be controlled to apply the voltage to the first transparent conductive layer and the second conductive layer to control the electrochromic layer to change its color.

In an embodiment of the present disclosure, the insulation adhesive may be provided on the periphery of the electrochromic device, and the insulation adhesive may seal and insulate the electrochromic layer to avoid interference from the external environment. In an embodiment of the present disclosure, the type of the insulation adhesive may be suitably selected by those skilled in the art, for example, the insulation adhesive may be an insulation tape. A thickness of the insulation tape is consistent with the sum of the thicknesses of the electrochromic layer, the electrolyte layer and the ion storage layer. Therefore, the electrochromic layer, the electrolyte layer and the ion storage layer may be sealed. In other embodiments of the present disclosure, the insulation adhesive may be glue. The insulation adhesive may be provided on the periphery of the first transparent conductive layer and the second conductive layer in a dispensing manner to seal the electrochromic layer, the electrolyte layer and the ion storage layer. It should be particularly noted that the first transparent conductive layer and the electrochromic layer may be sequentially provided on the first substrate, and then the second conductive layer (or the second conductive layer, the ion storage layer and the electrolyte layer in sequence) may be arranged on the second substrate. Alternatively, the second conductive layer (or the second conductive layer, the ion storage layer, and the electrolyte layer in sequence) may be arranged on the second substrate, and then the first transparent conductive layer and the electrochromic layer may be sequentially arranged on the first substrate. That is, the order of forming the first substrate and the second substrate provided with multilayer structures may be suitably selected by those skilled in the art, as long as the desired structure for each of the two substrates is formed before packaging.

In block S200: forming a pattern layer.

In this operation, the pattern layer is formed. In an embodiment of the present disclosure, the pattern layer may be formed on the side of the first substrate away from the first transparent conductive layer, or located at any position between the first substrate and the second conductive layer. As mentioned above, the ink may be printed directly on the first substrate to form the pattern layer, or a pattern layer with certain color, pattern and texture may be formed on the film (e.g., a PET film) in advance, and the pattern layer including the film is bonded on the corresponding position in the electrochromic device.

In specific embodiments of the disclosure, the pattern layer may be located between a first optical adhesive layer and a second optical adhesive layer, and the pattern layer is fixed by the first optical adhesive layer and the second optical glue layer. Specially, the electrochromic device may further include a base, and the pattern layer may be fixed on a surface of the base through the second optical adhesive layer. Moreover, the electrochromic unit may be fixed on a side of the first optical adhesive layer away from the pattern layer through the first optical adhesive layer. In an embodiment of the present disclosure, as mentioned above, when the pattern layer is formed on the side of the first substrate away from the first transparent conductive layer, the pattern layer may be fabricated as an independent unit. After the pattern layer is fabricated, it may be easily bonded on the surface of the first substrate through the optical adhesive (e.g., it may be bonded on the surface of the first substrate through the first optical adhesive layer), such that there is no need to change the existing fabricating process of the electrochromic unit, and the operation is relatively simple. Moreover, the pattern layer and the electrochromic unit may also be bonded on the base (i.e., the board of the electrochromic device) through the second optical adhesive layer. Therefore, the molding process of the base is relatively simple, and the existing production process may be used without considering the difficulty of forming the electrochromic unit on the base. The types of the materials fabricating the pattern layer are also relatively abundant. For example, ink may be printed on the film for optical coating without considering that when the pattern layer and the electrochromic unit are fabricated together, the high deposition temperature of the first transparent conductive layer and the second conductive layer will affect the shape and properties of the ink layer. For example, when the electrochromic unit is fabricated, there is no need to consider whether the ink layer is resistant to high temperature, and the first substrate and the second substrate may be fabricated from flexible materials. Later, the electrochromic unit may be bonded to the pattern layer and the base by optical glue.

In specific embodiments of the disclosure, when the pattern layer is formed on the side of the first transparent conductive layer away from the first substrate, the method may further include as following. First, the first transparent conductive layer is formed on the first substrate; the pattern layer is formed on the side of the first transparent conductive layer away from the first substrate; and then the electrochromic layer is formed to cover the pattern layer and a part of the first transparent conductive layer that is not covered by the pattern layer.

In specific embodiments of the disclosure, when the pattern layer is formed on the side of the first substrate near the first transparent conductive layer, the method may further include as following. First, an ink is printed on the surface of the first substrate near the first transparent conductive layer to form the pattern layer; a transparent conductive material is deposited on the surface of the pattern layer away from the first substrate and a part of the surface of the first substrate facing to the pattern layer but not covered by the pattern layer to form the first transparent conductive layer. It should be noted that in the existing method commonly used for depositing and forming the first transparent conductive layer on the first substrate, for example, depositing indium tin oxide (ITO) on the first substrate, the deposition temperature is generally from 300° C. to 450° C. In the method according to the embodiments of the present disclosure, since the ink layer (i.e., the pattern layer) is printed on the first substrate in advance, the ink layer (i.e., the pattern layer) has poor high temperature resistance. Therefore, in the present disclosure, when ITO is deposited on the side of the pattern layer away from the first substrate and the surface of the first substrate, the deposition temperature is lower, for example, the deposition temperature is not more than 350° C. Moreover, when the ink layer is formed as described in the previous operations, the ink used is a high temperature resistant ink. Therefore, it could be guaranteed that when ITO is deposited on the ink layer, the performance of the ink layer will not be affected, and the deposited ITO layer also has better performances.

In an embodiment of the present disclosure, the thickness of the deposited first transparent conductive layer may not be less than 30 nm, e.g., from 30 nm to 250 nm, thus avoiding the defects caused by too small thickness of the first transparent conductive layer. Specifically, the thickness of the first transparent conductive layer may be from 150 nm to 250 nm, such that the first transparent conductive layer with this thickness has better performances.

In an embodiment of the present disclosure, when the first transparent conductive layer is deposited, a deposition rate may be from 5 nm/min to 15 nm/min. Therefore, the first transparent conductive layer with good performance may be formed. When the deposition rate is too high or too small, the surface of the deposited first transparent conductive layer will be uneven and poor in uniformity. Specifically, the deposition rate may be from 7 nm/min to 10 nm/min. In a specific embodiment of the present disclosure, when the first transparent conductive layer is formed on the first substrate with an area of 150 mm*70 mm, a deposition time is from 15 to 20 minutes, the thickness of the deposited first transparent conductive layer is 150 nm, and the deposition area may be 150 mm*70 mm.

In specific embodiments of the disclosure, when the pattern layer and the electrolyte layer are provided in one layer, the method may further include as following. First, the pattern layer including the film is bonded on the surface of the electrochromic layer away from the first transparent conductive layer, and then the electrolyte layer is formed on the surface of the electrochromic layer away from the first transparent conductive layer where is not covered by the pattern layer. Moreover, the thickness of the pattern layer is equal to that of the electrolyte layer, such that the thickness of the electrolyte layer may be easily adjusted by adjusting the thickness of the film forming the pattern layer.

In block S300: forming a bottom printed layer.

In this operation, the bottom printed layer is formed on the side of the second substrate away from the second conductive layer to shield components in the electronic device, which may further improve the final effect of the electrochromic device. In an embodiment of the present disclosure, ink with different colors may be printed directly on the surface of the second substrate away from the second conductive layer, or different texture effects may be set. Alternatively, a film (e.g., a polyethylene terephthalate film) with a certain color or texture effect may be bonded on the surface of the second substrate away from the second conductive layer to form the bottom printed layer.

Figure 9:
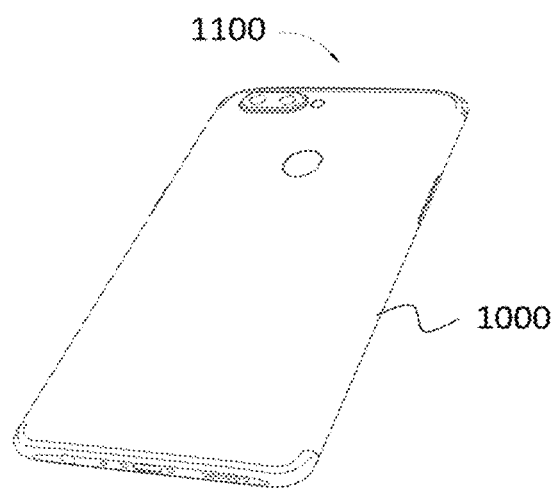
FIG. 9 is a schematic view illustrating an electronic equipment according to an embodiment of the present disclosure.

In still another aspect of this present disclosure, an electronic equipment is provided. In an embodiment of the present disclosure, referring to FIG. 9, the electronic equipment 1100 includes the above-mentioned electrochromic device 1000, a control circuit (not shown in the figure) and a screen (not shown in the figure). The control circuit is configured to control the electrochromic device 1000 to change its color according to an operating state of the electronic equipment 1100, and the screen is configured to display information. Therefore, the electronic equipment has all the features and advantages of the above-mentioned electrochromic device, and will not be repeatedly described here. In general, the electronic device has a diversified appearance and an improved expressiveness.

In an embodiment of the present disclosure, the control circuit may control the voltage of the electrochromic device to change in color according to the operating state of the electronic equipment 1100. In an embodiment of the present disclosure, the electrochromic device 1000 may be an outer housing of the electronic equipment 1100, such that the housing of the electronic equipment may achieve a variety of contrast color effects and color changing effects, and thus the electronic equipment has a diversified appearance and an improved expressiveness.

For example, the electronic equipment may be any one of various mobile or portable computer system devices which are able to realize wireless communication. Specifically, the electronic equipment may be a mobile phone or a smart phone (e.g., a phone based on iPhone™ or Android™), a portable game device (e.g. Nintendo DS™, PlayStation Portable™, Gameboy Advance™, iPhone™), a laptop computer, a PDA, a portable internet terminal device, a music player and a storage device or other handset device (e.g., a watch, an in-ear earphone, a pendant, a headphone, etc.). The electronic equipment may also be other wearable devices (e.g., electronic glasses, electronic clothes, electronic bracelets, electronic necklaces, electronic tattoos, electronic devices, smart watches and head-mounted devices (HMD)).

The electronic equipment may also be any one of a plurality of electronic equipments including, but not limited to, a cellular phone, a smart phone, other wireless communication device, a personal digital assistant, an audio player, other media player, a music recorder, a video recorder, a camera, other media recorder, radio, a medical equipment, a vehicle transportation equipment, a calculator, a programmable remote controller, a pager, a laptop computer, a desktop computer, a printer, a netbook computer, a personal digital assistant (PDA), a portable multimedia player (PMP), a motion picture expert group (MPEG-1 or MPEG-2) audio layer 3 (MP3), a portable medical equipment, a digital camera or any combination thereof.

In some cases, the electronic equipment may exhibit various functions (e.g., playing music, showing video, storing pictures and transmitting/receiving telephone calls). If desired, the electronic equipment may be a cell phone, a media player, other handset device, a wrist watch device, a pendant device, an earpiece device or other compact portable device.

The embodiments of the present disclosure are described in detail above. However, the present disclosure is not limited to the specific details in the above-mentioned embodiments. Within the scope of the techniques of the present disclosure, a variety of simple modifications may be made to the technical solution of the present disclosure. It belongs to the protection scope of this disclosure.

It should be noted that the various specific technical features described in the foregoing specific embodiments may be combined in any suitable manner without contradiction.

In addition, various different embodiments of this present disclosure may also be combined, as long as they do not violate the idea of this disclosure, they should also be regarded as the content disclosed in this disclosure.

What is claimed is:

1. An electrochromic device, comprising:
   a first substrate and a second substrate provided opposite to each other;
   a first transparent conductive layer and a second conductive layer provided between the first substrate and the second substrate;
   an electrochromic layer provided between the first transparent conductive layer and the second conductive layer;
   a bottom printed layer provided on a surface of the second substrate away from the second conductive layer; and
   a pattern layer;
   wherein an orthographic projection of the pattern layer on the first substrate covers at most a part of a surface of the first substrate, and a color of the electrochromic device varies as a voltage between the first transparent conductive layer and the second conductive layer changes.

2. The electrochromic device of claim 1, further comprising:
   a first optical adhesive layer located on a surface of the first substrate away from the first transparent conductive layer, wherein the pattern layer is bonded at the first substrate by the first optical adhesive layer;
   a second optical adhesive layer located on a surface of the pattern layer away from the first optical adhesive layer; and
   a base bonded at a side of the pattern layer away from the first substrate by the second optical adhesive layer.

3. The electrochromic device of claim 1, wherein the pattern layer is located between the first substrate and the first transparent conductive layer.

4. The electrochromic device of claim 1, wherein the first transparent conductive layer has a thickness of 30 nm to 250 nm.

5. The electrochromic device of claim 1, wherein the pattern layer is located between the first transparent conductive layer and the electrochromic layer.

6. The electrochromic device of claim 1, further comprising:
   an electrolyte layer and an ion storage layer sequentially arranged, wherein the electrolyte layer and the ion storage layer are located between the electrochromic layer and the second conductive layer, and the electrolyte layer is located near the electrochromic layer.

7. The electrochromic device of claim 6, wherein the pattern layer and the electrolyte layer are provided in one layer, and a thickness of the pattern layer is equal to that of the electrolyte layer.

8. The electrochromic device of claim 6, wherein the pattern layer is located between the second conductive layer and the ion storage layer.

9. The electrochromic device of claim 1, wherein the second conductive layer is formed from a transparent conductive material.

10. The electrochromic device of claim 1, wherein the pattern layer comprises at least one selected from a group consisting of a texture printed sublayer, an optical coating sublayer and an ink sublayer.

11. The electrochromic device of claim 1, wherein the first transparent conductive layer and the second conductive layer are each formed from at least one selected from a group consisting of indium tin oxide, indium zinc oxide, indium gallium zinc, aluminum zinc oxide, and nano silver.

12. The electrochromic device of claim 1, further comprising:
   a connecting wire connected to the first transparent conductive layer and the second conductive layer.

13. A method for preparing an electrochromic device, comprising:

forming an electrochromic unit;
forming a pattern layer; and
forming a bottom printed layer;
wherein forming the electrochromic unit comprises providing a first transparent conductive layer, an electrochromic layer and a second conductive layer sequentially between a first substrate and a second substrate provided opposite to each other;
wherein an orthographic projection of the pattern layer on the first substrate covers at most a part of a surface of the first substrate; and
wherein the bottom printed layer is formed on a surface of the second substrate away from the second conductive layer.

14. The method of claim 13, wherein forming the electrochromic unit comprises:
forming the first transparent conductive layer on the first substrate;
forming the electrochromic layer on a surface of the first transparent conductive layer away from the first substrate;
forming the second conductive layer on a side of the second substrate; and
mounting the first substrate on which the electrochromic layer is formed to the second substrate on which the second conductive layer is formed, wherein the electrochromic layer is in contact with the side of the second conductive layer away from the second substrate.

15. The method of claim 13, wherein forming the electrochromic unit comprises:
forming the first transparent conductive layer on the first substrate;
forming the electrochromic layer on the first transparent conductive layer; and
forming the second conductive layer on the electrochromic layer.

16. The method of claim 13, wherein the pattern layer is located between a first optical adhesive layer and a second optical adhesive layer, the electrochromic device further comprises a base, and forming the pattern layer comprises:
forming the pattern layer on a surface of the base through the second optical adhesive layer, and
providing the electrochromic unit on a side of the first optical adhesive layer away from the pattern layer.

17. The method of claim 13, comprising:
forming the first transparent conductive layer on the first substrate;
forming the pattern layer on a side of the first transparent conductive layer away from the first substrate; and
forming the electrochromic layer to cover the pattern layer and a part of the first transparent conductive layer that is not covered by the pattern layer.

18. The method of claim 13, comprising:
printing an ink on the surface of the first substrate to form the pattern layer; and
depositing a transparent conductive material on the surface of the first substrate, where the pattern layer is provided, to form the first transparent conductive layer, wherein a deposition temperature is not more than 350° C., and a deposition rate is 5 to 15 nm/min, the first transparent conductive layer covers a surface of the pattern layer away from the first substrate and a part of the first substrate that is not covered by the pattern layer.

19. The method of claim 13, further comprising:
after forming the electrochromic device, forming an ion storage layer and forming the pattern layer on a first part of a surface of the ion storage layer away from the second conductive layer, forming an electrolyte layer on a second part of the same surface of the ion storage layer that is not covered by the pattern layer, and controlling a thickness of the electrolyte layer to match a thickness of the pattern layer.

20. An electronic equipment, comprising:
an electrochromic device, comprising:
a first substrate and a second substrate provided opposite to each other;
a first transparent conductive layer and a second conductive layer provided between the first substrate and the second substrate;
an electrochromic layer provided between the first transparent conductive layer and the second conductive layer;
a bottom printed layer provided on a surface of the second substrate away from the second conductive layer; and
a pattern layer;
wherein an orthographic projection of the pattern layer on the first substrate covers at most a part of a surface of the first substrate, and a color of the electrochromic device varies as a voltage between the first transparent conductive layer and the second conductive layer changes;
a control circuit configured to control the electrochromic device to change its color according to an operating state of the electronic equipment; and
a screen configured to display information.

* * * * *